(12) United States Patent
Blackson et al.

(10) Patent No.: US 7,483,859 B2
(45) Date of Patent: Jan. 27, 2009

(54) SYSTEM AND METHOD FOR DISPENSING DIGITAL INFORMATION FROM AN AUTOMATED TRANSACTION MACHINE

(75) Inventors: Dale Blackson, Canton, OH (US);
James R. Church, Kent, OH (US);
Mark Smith, North Canton, OH (US);
Natarajan Ramachandran, Uniontown, OH (US)

(73) Assignee: Diebold, Incorporated, North Canton, OH (US)

( * ) Notice: Subject to any disclaimer, the term of this patent is extended or adjusted under 35 U.S.C. 154(b) by 1738 days.

(21) Appl. No.: 09/776,503

(22) Filed: Feb. 2, 2001

(65) Prior Publication Data

US 2002/0013771 A1 Jan. 31, 2002

Related U.S. Application Data

(60) Provisional application No. 60/180,490, filed on Feb. 5, 2000, provisional application No. 60/250,269, filed on Nov. 30, 2000.

(51) Int. Cl.
*G06Q 40/00* (2006.01)
(52) U.S. Cl. .............................. 705/43; 705/36; 705/26; 705/27
(58) Field of Classification Search ................. 709/200; 395/200; 705/43, 35, 26, 27
See application file for complete search history.

(56) References Cited

U.S. PATENT DOCUMENTS 5,450,938 A 9/1995 Rademacher

| | | | | |
|---|---|---|---|---|
| 5,778,187 A | * | 7/1998 | Monteiro et al. | 395/200 |
| 5,780,825 A | | 7/1998 | Sato et al. | |
| 5,930,765 A | * | 7/1999 | Martin | 705/14 |
| 6,035,336 A | * | 3/2000 | Lu et al. | 709/232 |

(Continued)

FOREIGN PATENT DOCUMENTS

GB 2328532 2/1999
WO WO 95/30212 * 11/1995

OTHER PUBLICATIONS

Merriam-Webster's Collegiate Dictionary, 10th Edition, Copyrights 1993, 1999, p. 335.*

(Continued)

*Primary Examiner*—Jagdish N Patel
(74) *Attorney, Agent, or Firm*—Ralph E. Jocke; Daniel D. Wasil; Walker & Jocke

(57) ABSTRACT

An automated teller machine (ATM) (10) includes an input device (16) a card reader (20), a cash dispenser (24), and an output device (18). The ATM is operative to read account information from a card with the card reader and validate a user PIN input through the input device. The ATM is also operative to dispense cash with the cash dispenser and dispense digital content with the output device responsive to user input selections. The ATM is further operative to charge a user fee to an account associated with the card for the dispense of cash and digital content. The digital content may be acquired by the ATM from a digital information source on the Internet or other network. Licensing fees associated with the dispense of the digital files may be transferred to a source or licensing entity associated with the digital content.

91 Claims, 3 Drawing Sheets

U.S. PATENT DOCUMENTS

| | | | |
|---|---|---|---|
| 6,154,879 | A | 11/2000 | Pare, Jr. et al. |
| 6,189,783 | B1 | 2/2001 | Motomiya et al. |
| 6,193,155 | B1 | 2/2001 | Walker et al. |
| 6,199,754 | B1 | 3/2001 | Epstein |
| 6,381,626 | B1 * | 4/2002 | De Leo ............... 709/200 |
| 6,477,532 | B1 * | 11/2002 | Duliege ............... 707/10 |
| 6,748,539 | B1 * | 6/2004 | Lotspiech ............... 726/20 |

OTHER PUBLICATIONS

Bank Network News ("Internet Technology Pushes New Services to ATMs (Canadian Imperial bank of Commerce (Toronto) will test Internet-type technology to tailor ATM offerings to the need of cardholders"), v 15, n 22, p. 7, Apr. 11, 1997.*

* cited by examiner

SYSTEM AND METHOD FOR DISPENSING DIGITAL INFORMATION FROM AN AUTOMATED TRANSACTION MACHINE

CROSS REFERENCE TO RELATED APPLICATIONS

This application claims benefit pursuant to 35 U.S.C. § 119(e) of Provisional Application Ser. Nos. 60/180,490 filed Feb. 5, 2000 and No. 60/250,269 filed Nov. 30, 2000.

TECHNICAL FIELD

This invention relates to the dispensing of digital information from an automated transaction machine. Specifically this invention relates to a system and method for downloading and dispensing digital information such as sound recording files from an automated transaction machine.

BACKGROUND ART

Automated transaction machines are known in the prior art. For purposes of this disclosure an automated transaction machine shall include any device which is capable of carrying out transactions including transfers of value. A common type of automated transaction machine is an automated teller machine (ATM). ATMs are typically operative to perform banking transactions such as dispensing cash, transferring value between banking accounts, or accepting deposits. Many ATMs are located in retail or service facilities such as stores, gas stations, restaurants and bars. The owners of these facilities often generate income from the ATMs through service fees on transactions performed with the ATM. For example if a user withdraws an amount of cash from the ATM, the user may be charged a small transaction fee.

If the ATM has only marginal use, the income generated may not be sufficient to justify the expense of maintaining the ATM. For example maintenance and service costs may consume a large portion of the monthly income generated by an ATM which has low transaction volumes. Consequently to enable ATMs to generate additional income there exists a need for an ATM to perform additional income producing activities that do not significantly increase the expense of maintaining the ATM.

Methods for the digital recording of sound are also known in the prior art. Such digital recordings are typically distributed on compact disks (CD) for playback on a CD player. As sound systems have become a standard feature of any new personal computers, digital sound recordings are also being distributed as computer files. Common formats for sound computer files include WAV (Waveform Audio File Format) and MP3 (MPEG-1 Audio Layer-3). To play such files, computer systems can employ a sound file player application such as the Windows Media Player. Sound file player applications read the digital sound files and output corresponding music through the sound card and speakers of the computer system.

Digital sound recordings may also be copied directly from an audio CD through a process called "ripping." Essentially ripping refers to the reading of the digital information that represents audio on the CD and saving the information in a computer readable sound file. Different formats of sound files have different characteristics. For example WAV files are typically uncompressed digital versions of sampled sound. MP3 files are typically created by compressing a sound sequence into a very small file (about one-twelfth the size of a corresponding WAV file). However, MP3 files are "lossy" meaning that the compression algorithms remove digital information that most people cannot hear or cannot distinguish from other sounds. If a high sampling rate is used to generate the MP3 files, the sound quality is only slightly inferior to that of the original audio file. However, the advantage of the smaller size of the MP3 files is significant. These advantages include the ability to store more hours of sound recordings per amount of space in physical storage mediums such as, for example, hard disks, RAM, and flash memory cards. Also, the smaller size of MP3 files enables them to be downloaded much faster through a network such as the Internet.

Numerous web sites on the Internet offer digital sound files such as MP3 files for downloading to a personal computer. Also as a result of the popularity of digital sound files, portable computer systems have been developed such as the Diamond RIO which are specifically designed to load and play sound recording files.

Unfortunately, the technology associated with creating MP3 files from a CD and downloading MP3 files from web sites has resulted in a significant amount of music piracy and lost revenues for artists and music recording companies. Anyone with a home PC can generate an unlimited number of copies of digital sound files. By placing such pirated files on an Internet web site, unlimited distribution of pirated sound files is possible.

To deter copyright infringement and unrestricted piracy of digital sound recordings, the music industry is promoting an alternative file format for storing digital recordings called SDMI (Secure Digital Music Initiative). The SDMI specification for sound files offers similar compression characteristics as the MP3 file format; however, SDMI is designed to have built in copyright protection features which limit the playback and duplication of the files. In addition Microsoft has developed an alternative specification for compressing and copyright protecting sound files called Windows Media.

Because MP3 files are already wildly accepted as the de facto standard, it may be very difficult for new file formats to replace MP3. The popularity of MP3 files coupled with unlimited sound file piracy may significantly decrease the revenue that recording labels and artists generate from the sale of music and other forms of audio. Consequently, there exists a need for a system of distributing MP3 files that enables the copyright holder to receive licensing fees for each distribution of an MP3 file.

Distribution of sound recordings from the Internet makes it much easier for an individual artist to reach a mass audience for their work without a recording label. As a result the variety of music that is available over the Internet is exploding. Many of the titles can be downloaded without a fee. Unfortunately much of the music that has no fee is low quality, amateurish, and not very desirable. If the artist is relatively unknown, it is very difficult to get users to download music for a fee. This is because most individuals are hesitant to pay for downloaded MP3 files before being familiar with the artist.

If the music is given away on a no-fee basis or even a low-fee preview basis, it may be difficult to generate any income from the music. Once the MP3 version of the music is downloaded, the MP3 file can be played, copied, and distributed an unlimited number of times without generating income for the artist. Consequently there exists a need for a system that enables individuals to test out songs for a small fee, but does not enable the users to copy or distribute the sound files.

To take advantage of the benefits of playing sound recording files rather than CDs or cassettes, a user must have a PC. Although the cost of a personal computer has dramatically decreased over the last two decades, computers are still significantly more expensive than a CD player. Portable sound file players such as the Diamond RIO are operative to play music independently from a PC; however they still must be connected to a PC at some point to upload a new set of MP3 files. Consequently there exists a need for a new system of distributing sound files that does not require the user to have a computer.

The current methods for delivery of forms of audio, visual, paint and other media may also have drawbacks. Consequently there exists a need for a better way of delivering the content of such media.

DISCLOSURE OF INVENTION

It is an object of an exemplary embodiment of the present invention to provide an automated transaction machine that is operative to dispense digital information.

It is a further object of an exemplary embodiment of the present invention to provide an automated transaction machine that is operative to dispense digital information to a portable storage medium.

It is a further object of an exemplary embodiment of the present invention to provide an automated transaction machine that is operative to dispense digital information to a portable computing system.

It is a further object of an exemplary embodiment of the present invention to provide an automated transaction machine that is operative to dispense digital information in exchange for a user fee.

It is a further object of an exemplary embodiment of the present invention to provide an automated transaction machine that is operative to output digital information to an output device in exchange for a user fee.

It is a further object of an exemplary embodiment of the present invention to provide an automated transaction machine that is operative to distribute user fee income generated from the dispense of digital information among a plurality of entities.

It is a further object of an exemplary embodiment of the present invention to provide an automated transaction machine that is operative to download digital information from a digital information source located on a network.

It is a further object of an exemplary embodiment of the present invention to provide an automated transaction machine that is operative to dispense digital sound recordings.

It is a further object of an exemplary embodiment of the present invention to provide an automated transaction machine that is operative to play digital sound recordings through a sound system.

It is a further object of an exemplary embodiment of the present invention to provide an automated transaction machine that is operative to dispense digital sound recordings onto a portable storage medium.

It is a further object of an exemplary embodiment of the present invention to provide an automated transaction machine that is operative to dispense digital sound recordings to a portable digital sound file player.

It is a further object of an exemplary embodiment of the present invention to provide an automated transaction machine that is operative to charge an account of a user in exchange for the playing of digital sound recordings.

It is a further object of an exemplary embodiment of the present invention to provide an automated transaction machine that is operative to provide a selection of digital sound recordings to play when the user performs a banking or other transaction at the machine.

It is a further object of an exemplary embodiment of the present invention to provide an automated transaction machine that is operative to offer a selection of digital sound recordings to play that are downloaded from a network such as the Internet.

Further objects of exemplary embodiments of the present invention will be made apparent in the following Best Modes for Carrying Out Invention and the appended claims.

The foregoing objects are accomplished in one exemplary embodiment of the invention by an ATM that is operative to dispense digital information which is also referred to herein as digital content. In the exemplary embodiment the digital information includes digital sound recording files that may be output through an output device such as a sound system in operative connection with the ATM. However in alternative embodiments, the digital information may include other types of information that may be digitally stored and transported over a network. Other examples of digital information include digital representations of images, books, software, audiovisual works, movies, TV shows, magazines, newspapers, games, compilations, and databases.

The ATM is in operative connection with storage read/write devices such as a floppy disk drive, smart card drive, flash memory drive, or any other device that is operative to read and write information to a portable storage medium. In the exemplary embodiment the ATM is operative to save digital information such as digital sound recording files to the portable medium.

Alternative embodiments of the ATM may include a portable computing device communication port that is operative to communicate with a portable computing device. When a portable computing device, such as a laptop computer, handheld computer, or sound file player is placed in operative connection with the communication port, the ATM is operative to send digital information such as digital sound recording files to the portable computing device. Examples of communication ports that are operative for use with embodiments of the present invention include a Universal Serial Bus (USB) port, parallel port, RS-232 Serial Port, Infrared (IR) Port, Radio Frequency (RF) port, or any other type of physical or wireless communication port.

The ATM is operatively programmed to accept a fee from a user in exchange for outputting either digital information or saving digital information to a portable storage medium or portable computing device. For ATMs that include a card reader and are in operative connection with a host banking system, the ATM may be operative to charge the fee to an account associated with a credit card, debit card, or smart card for example. For ATMs that include a currency accepting device, the ATM may be operative to accept currency in exchange for outputting or saving digital information.

In an exemplary embodiment of the present invention, the ATM is in operative connection with a private network or public network such as the Internet. The ATM is programmed to enable a user of the ATM to view and select digital information that is downloaded across the network. For example the ATM is operative to display visual outputs corresponding to a plurality of sound recording files such as MP3 files, that can be executed to reproduce individual musical performances such as songs. The ATM is further operative to download one or more of these sound files in exchange for a fee and to either play the song through a sound system or send the song to a portable storage medium or computing device.

In an alternative form of the present invention, the ATM may be operative to periodically download a selection of digital information in response to programmed instructions to acquire one or more categories of digital information. By pre-downloading and storing digital information, the ATM does not need to be continually connected to a source of digital information. Also any delay caused by having to download individually selected information files across a network is eliminated because the files are stored locally in the ATM.

For example when the digital information corresponds to sound recording files, the ATM may be operative to periodically download sound files that correspond to the most popular songs for the week or other time period. In another example if the digital information corresponds to digital books, the ATM may be operative to periodically download digital books that correspond to a fiction or nonfiction best seller list or ranking. In another example if the digital information corresponds to broadcast TV shows, the ATM may be operative to periodically download digital files that correspond to the TV shows that were broadcast over a certain time period. Of course in other embodiments other types of digital information may be delivered and stored in the machine for delivery to users, or downloaded at the time in response to the user's request.

In an exemplary embodiment of the present invention, the ATM may be operative to distribute the user fees for the dispense of digital information among a plurality of entities, including the owner of the ATM, the source of the digital information, and/or a licensing organization. This distribution may be performed for each user transaction or may be performed on a periodic basis. When the distribution is performed periodically, the ATM is operative to calculate an amount of value that corresponds to licensing fees for digital information that is downloaded or dispensed by the ATM during a time period. An amount of value equal to this calculated amount may then be transferred from an account associated with the ATM such as the operator thereof to the source(s) of the digital information and/or to licensing organizations.

When the digital information requires copy protection features, the ATM may be further operative to include or activate a copy protection feature responsive to the type of license being purchased by the user. For example, if the ATM dispenses SDMI or Windows Media sound recording files, the ATM may be operative to configure the files to limit where and how long the sound files can be played as well as whether duplication is allowed.

BEST MODES FOR CARRYING OUT INVENTION

Figure 1:
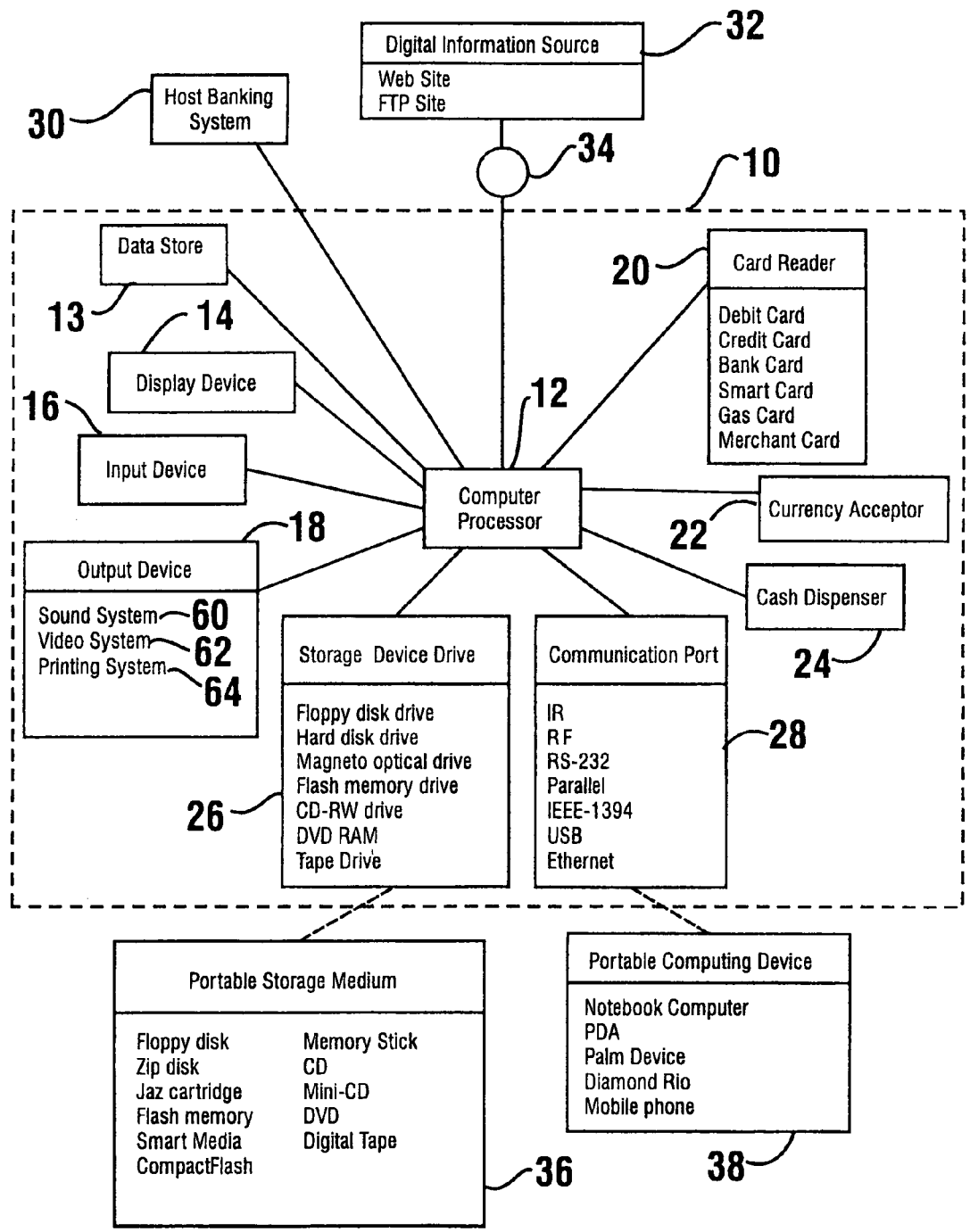
FIG. 1 is a schematic view representative of an exemplary embodiment of an automated transaction machine and system of the present invention that is operative to dispense digital information.

Referring now to the drawings and particularly to FIG. 1, there is shown therein a schematic view of an automated transaction machine of an exemplary embodiment of the ATM 10 of the present invention. The ATM 10 includes at least one computer processor 12 that is operatively programmed to enable the ATM to perform at least one banking transaction such as the dispense of cash. The computer processor 12 is also operatively programmed to enable the ATM to dispense digital content which is alternatively referred to herein as digital information. To perform these functions the ATM further includes in operative connection with the computer processor 12, at least one data store 13, a display device 14, at least one input device 16, at least one output device 18, a card reader 20 which also serves as an input device, and a cash dispenser 24. The ATM 10 is further operative to communicate with at least one financial transaction processing computer which is operative to carry out financial transfers which in this example is host banking system 30. ATM 10 also is enabled to communicate with at least one digital information source 32. In the exemplary embodiment of the present invention the ATM 10 is operative to download digital information from the digital information source 32 through a network 34 such as the Internet.

It should be understood that the ATM 10 and system are exemplary and in other embodiments automated transaction machines may include other or additional devices and may operate in other types of systems. For example, embodiments of the present invention may include in operative connection with the computer processor 12, a currency acceptor 22, a data store including a storage device drive 26, and a communication port 28 which serves as an output device. The storage device drive 26 serves as a local data store and enables the computer processor to dispense digital information to a portable storage medium 36. The communication port 28 enables the computer processor to cause the dispense of digital information to a portable computing device 38.

Figure 2:
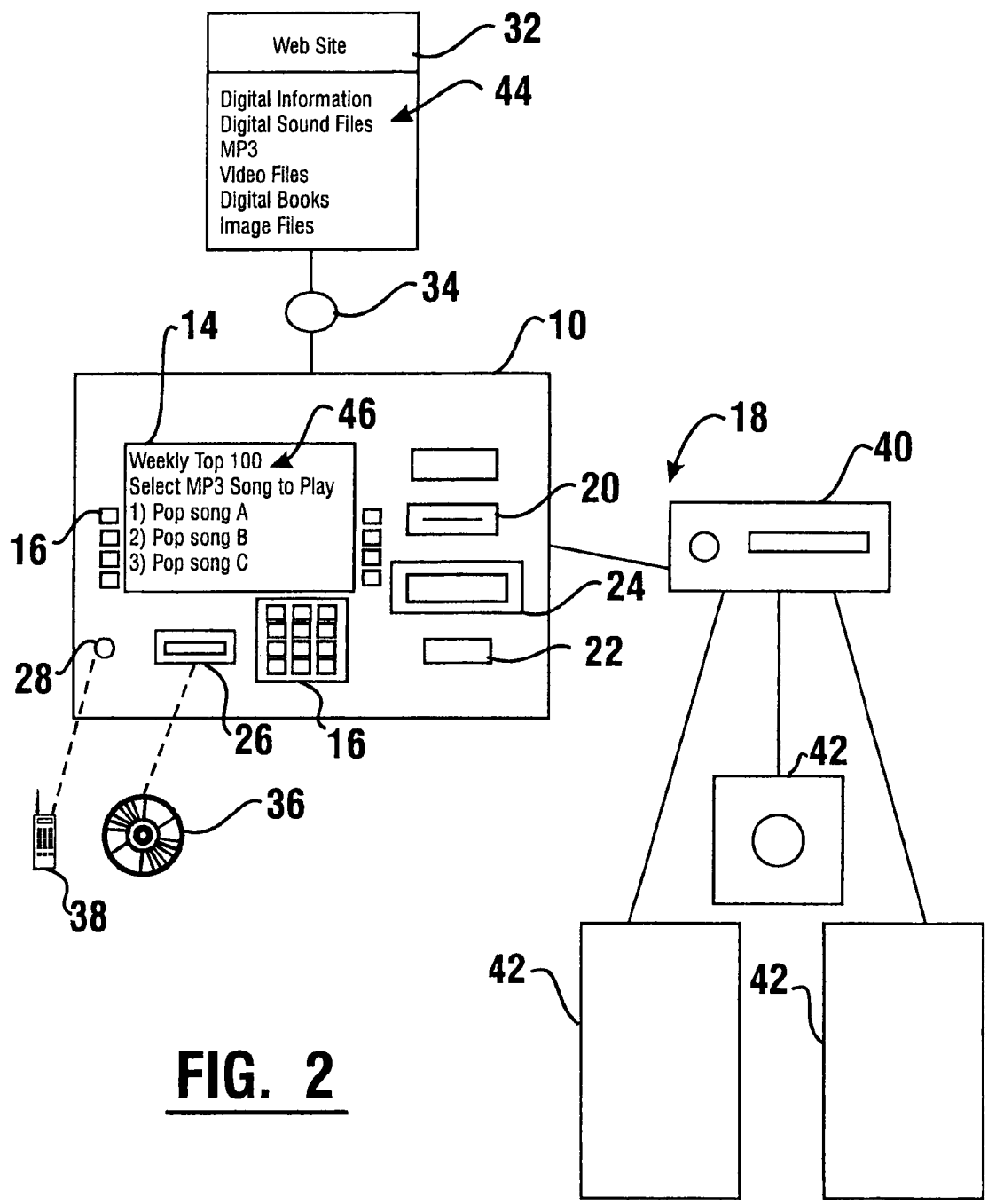
FIG. 2 is a schematic view representative of an exemplary embodiment of an automated transaction machine and system of the present invention that is operative to dispense digital sound recordings.

FIG. 2 schematically shows an exemplary embodiment of the ATM 10 that is operative to dispense both cash and digital content comprising sound recordings such as music and songs. However, it is to be understood that the present invention also encompasses the dispensing of other types of digital information including digital representations of images, books, software, audiovisual works, movies, TV shows, magazines, newspapers, games, compilations, databases and other types of digital content that may be delivered in a digital format.

Exemplary ATM 10 includes a display device 14 such as a CRT monitor or LCD display. The display device is operative responsive to the processor to output user interface indicia 46. The user interface indicia may include instructional outputs for operating the ATM as well as content indicia which are representative of the portions of digital information that may be dispensed from the ATM for a fee. In some embodiments the content indicia may include listings of songs, movies, books or other portions of the digital content which a user may select to have delivered. Exemplary embodiments may also include graphical representations regarding the information, such as pictures of the artist or CD liner in the case of music files. Audio and/or visual outputs may also be provided to identify, and in some cases enable the user to sample the available information.

Exemplary ATM 10 also includes at least one input device 16 such as a keypad and selection buttons. The input device(s) enable the user to enter operation inputs such as a personal 11 information number (PIN) corresponding to an account, an amount of cash to withdraw, or a selection of a particular digital sound recording or other portion of the digital content to dispense. Although this described embodiment includes function keys and a keypad, alternative embodiments of the present invention may use other or additional types of input devices for entering information, such as a touch screen device, a speech recognition system, or a track ball.

ATM 10 also includes a cash dispenser 24 and a card reader 20. The card reader 20 is operative to read indicia corresponding to account information from a user's card. The card may be a bank card, credit card, debit card, gas card, merchant card, smart card, or other medium that is operative to store account data and/or other information which may be used to identify a user or their accounts. In other embodiments the ATM may include a biometric type reading device which may identify the user by a characteristic thereof. Such biometric reading devices may include for example a fingerprint reader, iris scanner, retina scanner, voice recognition device, facial recognition reader or other device. The exemplary ATM 10 is operative to dispense a selected amount of cash to the user from the cash dispenser 24, and to debit the account of the user through communication with a financial transaction computer such as a host banking system. The exemplary ATM 10 is also operative to debit user fees from the account for dispensing digital information from the ATM as well.

In alterative embodiments of the present invention, the ATM may also include at least one currency accepting device 22. For users who do not wish to use an account to pay for the dispense of digital information, the ATM is operative to receive the user fees in the form of cash such as bills and/or coin, using the currency accepting device 22.

In the exemplary embodiment, the digital information dispensed by the ATM 10 includes digital sound recording files 44. Examples of digital sound recording files include MP3 files, WAV files, SDMI files, and Windows Media files. Typically each file corresponds to an individual music selection or song. However, sound files may correspond to any collection of sounds of any type and length. Other examples of sound recording files include compilations of songs such as are found on music CDs and spoken textual material corresponding to news articles, stories, speeches and books.

In the exemplary embodiment, the ATM 10 acquires sound files to dispense from at least one remote digital information source 32. The source 32 may include a web site or FTP site on the Internet, or sources in other public or private networks. The exemplary ATM 10 is operative to periodically download a plurality of sound files that match certain customizable programmed criteria. The ATM may also download corresponding graphics or video files associated with the sound files. These downloaded files are stored locally at the ATM in a local content data store 13 such as a hard drive. The ATM 10 is operative to display or output graphical, textual and/or audio content indicia representative of these sound files with the display device 14. A user of the ATM 10 may then provide one or more inputs to select and/or dispense one or more of these sound files.

The ATM may be programmably configured with different types of downloading criteria. For example, if the ATM is located in a dance club, the downloading criteria may be configured to have the ATM periodically download the sound files that correspond to the top 100 most popular dance songs for the month. If the ATM is located in a book store, the ATM may be configured to periodically download sound files representative of the best-selling fiction and nonfiction books for the month.

In the exemplary embodiment if the data store 13 does not have already stored therein the sound file that a user desires, the exemplary ATM is further operative to have the user enter a selection input corresponding to the desired sound file such as a title or the name of an artist or group. The ATM is then operative to query one or more remote content data stores for the requested sound file(s). A message is returned to the ATM which is operative to cause the processor to generate a listing of matching sound files which is displayed on the display device 14 of the ATM 10. In a response to one or more dispense inputs from the customer, and for a fee, the ATM 10 is then operative to download and dispense one or more of the matching sound files from an output device.

In embodiments of the invention in which a network connection such as an Internet connection is not available or is not always used, the ATM may be operative to acquire sound files from portable storage mediums such as CDs. Such sound files may then be copied or ripped from the CD and saved locally to the data store 13 in the machine.

The exemplary ATM may be operative to dispense digital information in a plurality of different ways depending on the type of digital information. For example the ATM described in connection with FIG. 2 further includes an output device 18 that includes a sound system 60. The sound system 60 includes a sound signal amplifier 40 with a plurality of speakers 42. The ATM 10 is operative to output though the sound system 60, analog or digital signals that correspond to selected digital sound recording files. The signal amplifier 40 is operative to output sound through the speakers 42 that corresponds to the sound file signals. Such an ATM may then function as a fee-based digital music player or jukebox. For restaurants, bars, and other facilities that offer music, the exemplary embodiment of the present invention offers the ability to generate user fees for both the dispensing of cash and the dispensing of audible music.

For other forms of digital information that is visual, such as text, documents, images or video for example, the ATM may be operative to output such digital content either through the display device 14 of the ATM 10 or through an output device 18 that includes a video system 62 or a printing system 64. A video system may include one or more monitors, TVs, speakers, LCD displays, or projection TV. The embodiments of the present invention may include multiple output devices for outputting multiple forms of digital information concurrently. A printing system 64 may include a monochrome or color printer capable of outputting documents and/or photo quality prints of images or other graphics.

If multiple sound files or other forms of digital information have been selected for output through the output device, the exemplary embodiment may be operative to sequentially output each song either in the order the digital information was selected, or in other orders, including alphabetical by title of song, artist, album, style, or in a random order.

Alternative embodiments of the present invention may also dispense digital information such as sound files, to other storage mediums. For example the ATM 10 may include a storage device drive 26 such as a CD-R or CD-RW drive which is operative to accept a portable storage medium 36 such as a write-once or rewriteable CD. For a fee the ATM may be programmed to dispense the sound file by writing a copy of the sound file on a user supplied CD. Alternatively, the ATM may include a supply of blank CDs or other media, and may copy the file onto the media and deliver it to the user. Examples of other types of storage device drives that are operative for use with embodiments of the present invention may include portable hard drive readers such as an Iomega Jaz® drive; magneto optical drives such as an Iomega Zip® drive; flash memory drives for writing to flash memory devices such as CompactFlash and Sony Memory Stick®; DVD-R, DVD-RW, and DVD-RAM drives, Mini-CD drives, and digital tape drives.

Alternative embodiments of the present invention may dispense digital information such as sound files, through an output device which includes a communication port 18 directly to a portable computing device. Examples of suitable communication ports 18 include a Universal Serial Bus (USB) port, a serial RS-232 port, parallel port, an infrared (IR) port, a radio frequency (RF) port such as Bluetooth, an IEEE-1394 port, or a network port such as a wired or wireless Ethernet connection. When a portable computing device such as a Diamond Rio is connected to the port 18, the ATM may be operative for a fee to download MP3 sound files to the RIO MP3 player. Examples of other types of portable computing devices that may receive dispensed digital information such as sound files include a portable computer such as a notebook computer, a personal digital assistant (PDA) and a mobile phone.

In alternative embodiments the present invention may be operative to dispense digital information to a user through the Internet by e-mail or FTP for example. In such embodiments the user may select the information through inputs to the ATM 10. The ATM would prompt the user to input through at least one input device an e-mail, FTP or other network delivery address. The ATM would then be operative through an output device such as a suitable network interface, to e-mail or FTP the selected digital information to the user, rather than dispensing the digital information through output devices, to a portable storage medium or to a computing device adjacent the ATM. Alternatively the ATM may send one or more messages through one or more networks to a remote computer, which messages cause the remote computer to send the selected digital content to the network address.

Figure 3:
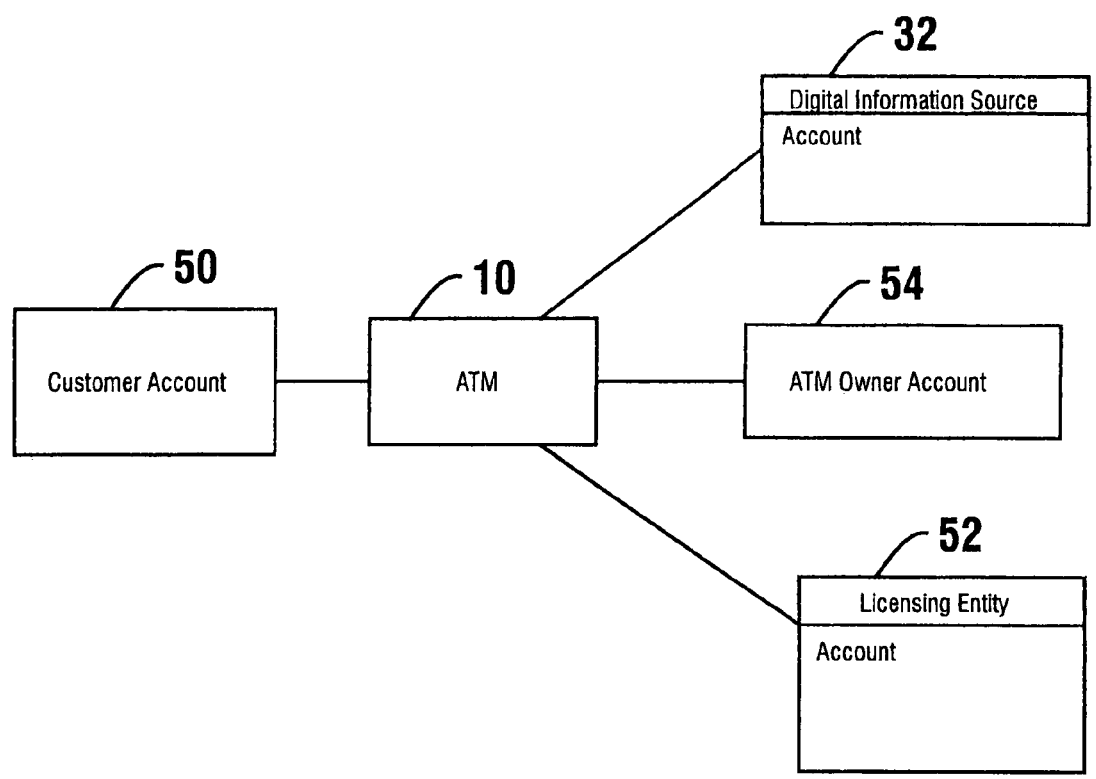
FIG. 3 is a schematic view representative of the distribution of transaction fees from digital information dispensed by an ATM.

FIG. 3 shows a schematic view representative of accounts that are accessed by the exemplary ATM 10 for distributing user fees. Because the ATM 10 is in operative connection with a host banking system, ATM 10 is enabled to deduct a user fee from an account of the user in exchange for the dispense of digital information. The exemplary embodiment of the ATM 10 operates by reading an account number from a card inserted by a user into the card reader 20. The account number includes data representative of the institution where the user's account is held. Examples of cards that are operative for use with some embodiments of the present invention include credit cards, bank cards, debit cards, merchant cards, smart cards, or any other portable medium that can store account or user information and/or data representative of stored value. The exemplary ATM 10 is operative to communicate with a financial transaction computer which includes or which can communicate with, a host banking system which can validate a user inputted PIN and authorize a transaction requested by the user at the ATM. If the PIN is valid and the transaction authorized, the message(s) sent by ATM 10 is further operative to cause the host banking system to debit user fees from the user's account corresponding to the requested dispense of cash and/or the requested dispense of digital information. Transaction fees or other charges for the convenience of using the machine may also be charged to the user's account. Alternatively as previously discussed, embodiments of the present invention may identify users by biometric information. The biometric data from the user may then be used by a local or remote computer to identify the user and/or their associated account information.

The dispensing of most digital information is limited by the copyright owner. Typically the copyright owner requires a fee or royalty to copy, display, publicly perform or otherwise deliver the work. The amount of the fee may vary depending on how the work is authorized to be used. For example if the work is a sound recording, the fee to play the sound file one time in a restaurant may be much less than the fee to dispense the sound file to a portable storage medium which may be duplicated an unlimited number of times. Consequently, an exemplary embodiment of the present invention is operative to track how digital information is dispensed and to transfer corresponding licensing fees to a licensing entity, a digital information source and/or other entities authorized to receive payment. Likewise stored information concerning the nature, location, size, contract status or other information concerning the establishment in which the particular ATM is located may be used to determine the fee. For example the fee to play a music file in a small restaurant may be less than in a large dance club. Similar principles may be applied to charging for other types of audio files, documents, images, videos, audio-visual files and pay-per-view type events.

The exemplary ATM 10 may be operative to debit a user fee from the user's account 50 for each dispense of digital information. The user fees may be transferred to a common banking account 54 of the operator of the ATM 10. Transfers of user fees may occur either immediately with each dispense and/or may occur periodically with the ATM 10 transferring data concerning multiple charges made to credit cards of various users to a financial transaction computer, such as a settlement host for example, which is operative to credit and debit accounts of the appropriate entities.

Licensing fees for downloading digital information from a digital information source may be transferred in a similar manner. The ATM 10 may generate messages or may include data in messages operative to cause a financial transaction computer to transfer a licensing fee from the account 54 that corresponds to the operator of the ATM 10, to an account of the digital information source 32. Such a transfer may be performed through the host banking system or through another transaction switch or through interaction of one or more financial transaction computers. Such transfers may occur with each download or may occur periodically for a batch of downloads which have occurred during a prior time period.

In an alternative embodiment, the ATM 10 is configured with inputs which include a terminal identifying UserID and a password for use when connecting through one or more networks to the digital information source 32. The UserID and password enable the ATM 10 to access the digital information source 32 and to download digital information. The digital information source 32 monitors all downloads that correspond to the UserID and periodically charges the account 54 that corresponds to the operator of the ATM. Alternatively for some types of digital information, the charge may be assessed against an account of the establishment where the ATM is located or an account of the operator of the establishment. This may be appropriate in cases where the use associated with the digital information, as indicated by the transaction messages received from the ATM and/or based on stored data, is a public display or performance of the work in the establishment. Of course other approaches may be used.

Once digital information has been downloaded to the data store 13 of the ATM 10, the copyright owner of the digital information may require that a licensing fee be paid with each dispense of the digital information to a user or upon each public display or performance. The ATM 10 or other connected computer is operative to keep records of each dispense of digital content and the character of dispense that is made. The exemplary ATM is further operative to transfer licensing fees associated with each dispense to an account of the digital information source 32 or another licensing entity 52 through the financial transaction computer. This transfer may be done with each dispense or periodically for a batch of dispenses.

In an alterative embodiment, the ATM 10 may be operative to transfer dispense records to the digital information source or the licensing entity through the Internet or other network. The digital information source 32 or licensing entity 52 may then debit or charge the licensing fees from an account that corresponds to the user, the operator of the ATM, the operator of the establishment or other appropriate entity.

For digital information that includes copy protection features or other technological measure to limit reproduction, access or use of the copyrighted work, the ATM 10 may be further operative to configure or incorporate the protection features and charge a user fee that corresponds to the copy or other protection features which are included. For example ATM 10 may be enabled to have the user select licensing features of a song file such as unlimited or restricted duplication, expiration dates, or other features of the sound file that affect the reproduction or use of the sound file. For example, the protection features used in some embodiments of the invention may restrict reproduction of the digital content so that it may only be played in the portable computing device to which it is initially delivered. Other features may restrict reproduction by preventing the digital content from being transferred from or otherwise reproduced in digital form from the media or device on which it is initially delivered. Other features may restrict reproduction by limiting the use of the digital content to a particular time period or to a particular number of plays. Of course additional or alternative approaches may be used depending on the system and the digital content involved. The ATM 10 may be operative to charge the user a corresponding user fee based on the type of protection features selected. The ATM may also be operative to cause the corresponding licensing or other fee to be paid to the source of the digital information or a licensing entity.

Alternative embodiments of the present invention may be used in connection with systems which include stored information concerning particular users. Such systems may be used to correlate the identity of the user with marketing or customer preference data. Such information may include particular categories of music, videos, books or other materials or products that can be provided and/or that are of interest to the particular user. The ATM may operate to automatically give the user options for selections tailored to their associated preference information. Alternatively such information may be used to automatically provide the user with digital files, visual or audio outputs or other outputs whenever the user operates an ATM connected to the system. For example when the ATM is operated as a jukebox, the ATM may operate to automatically display indicia corresponding to favorite artists or songs, or to output one or more of the user's favorite songs.

In certain embodiments of the invention it may not be desirable for a user to access their financial account each time a relatively small charge for digital information is assessed to the user. In such systems the system may be configured so that the user is required to make a "minimum purchase." This amount may be a charge reasonably sufficient to offset the costs of accessing the account, for example $10 or $20. This amount would then be credited to a content prepay account associated with the user. A prepay account record indicating a credit associated with the user or their account would then be stored in one or more data stores. This credit information may be stored locally on a smart card or other item, at the ATM or remotely in a computer such as a financial transaction computer which can be accessed from the ATM. For example in some embodiments the amount may be credited to a licensing or other organization. Alternatively, a financial transaction computer may debit the prepay account of the user as it is used and route payments to the appropriate entities. The amount of value associated with the prepay account may then be reduced each time the user receives a delivery of digital content until the account is exhausted. Such a system may be advantageously used where the fees involved in each digital file transaction are small, such as the cost or playing sound files. Such a system also provides the system operator, licensing entity, or other entity the benefit of the "float" on the allocated funds.

To discourage or limit the unauthorized reproduction of digital information that may be dispensed, exemplary embodiments of the present invention may be operatively programmed to modify features of the digital information before it is delivered for reproduction on a portable medium and computing device. For example with digital sound files, the processor in the ATM comprises a reproduction device that may embed a digital code or certificate in the sound file that is reproduced on the user's portable digital sound player or other personal computing device. Such a certificate may further include an encrypted digital signature that can be used to detect unauthorized alterations of the file.

The portable sound player would only be operative to play the sound file if the digital certificate corresponds to a unique code or certificate associated with the portable sound player. Also the portable sound player would only be operative to play the sound file if the digital signature indicates that the sound file is authentic. Such features would limit playback of the file to the user's personal sound player. The sound file would be inoperative on another personal sound playing device that is associated with a different certificate or code. Of course the same principles may be used with files that are downloaded to the ATM itself for storage in the local data store, when the files are only to be played through use of the ATM and not transferred to other devices.

In alternative embodiments the ATM may be operatively programmed to have the user register with a licensing entity for the digital content prior to dispensing digital content for the first time. During the registration process the user would be associated with a unique license code that may also be used when purchasing digital content in the future. The ATM may then be operative to embed the license code in each file that is dispensed for the user. The next time the user wishes to purchase digital information, the ATM may then be operatively programmed to accept the input of the license code from the user.

For example the license code may be manually input with the input device 16, read from a card with the card reader device 24, downloaded from the user's portable computing device 38, retrieved from another source and/or correlated with other data concerning the user. The ATM would then be operative to validate the license code by communicating with the licensing entity. If the license code is valid and/or is in good standing, the ATM would be operative to dispense additional digital information with the embedded license code of the user. Such a unique license code may be generated by the licensing organization, or may correspond to the previously described digital code or certificate associated with the user's computing device.

These described methods of copy and/or use protection of the dispensed digital information may be further associated with a subscription service or club. For example during the previously described registration process the ATM may prompt the user to sign up for a digital information service that for a monthly fee enables the user to dispense a certain amount and/or type of digital information. For example the service may correspond to the dispensing of music files or digital book text files. Each month the user would be entitled to dispense a certain amount of these files from the ATM for a discount club rate fee or for no additional fee per dispense transaction.

When the user first signs up for the service, the ATM may be further operative to enable the user to associate payment of the service or club fees to an account of the user for automatic debit of the monthly club dues or dispense fees from the user's account. Such automatic payment information may be acquired by reading account information from a user's credit card or banking card with the card reader device 20 of the ATM.

In an alternative exemplary embodiment, the present invention may be used to retrieve digital information previously associated with a user from a processor of the digital information. For example the exemplary ATM may be in operative connection with a photographic film processor. The user may for example input with an input device 16 of the ATM a processing number, code or other identification value associated with photographic film being developed and digitally scanned by the film processor. The exemplary ATM is operative to download digital images of the user's developed film from the processor which corresponds to the inputted processing number. The ATM is further operative to display the images and enable the user to select one or more of the images for printing to the printing system 64. The ATM may further enable the user to dispense the images to a physical medium and/or portable computing device of the user as previously described.

Exemplary embodiments of this described embodiment of the ATM may further enable the user to crop, zoom, and/or perform other imaging processing manipulations on the images prior to printing or dispensing. The exemplary ATM is operative to charge fees to an account of a user or accept cash from the user for the services of printing and/or dispensing the images. A portion of the fees may further be transferred by the ATM to the film processor.

In a further alternative exemplary embodiment, the ATM may accept the upload of digital images or other digital content from a portable storage medium, digital camera, or other device of the user. The exemplary ATM may then enable the user to selectively print, for a fee, individual images or other uploaded digital content with the printing system of the ATM.

The processor in ATM 10 operates to perform processes described herein responsive to software stored in one or more data stores, such as data store 13. The software stored in data store 13 is loaded therein from one or more forms of programming media. Such programming media may include any media from which computer instructions can be copied such as one or more CDs, diskettes, hard drives, tapes or other items.

The present invention may find applicability to numerous types of situations and may be used to facilitate the tracking of transactions in the entertainment, education, gaming, investment, merchandising and banking industries.

Thus the system and method for dispensing digital information of the present invention achieves at least one of the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function will be construed as encompassing any means known to those skilled in the art to be capable of performing the recited function, and will not be limited to the structures shown herein or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

We claim:

1. An automated transaction machine apparatus comprising:
    at least one computer processor;
    at least one data store in operative connection with the at least one computer processor, wherein the at least one computer processor is operative to cause a plurality of digital information files to be downloaded through a network from at least one remote digital information source and be saved in the at least one data store;
    at least one user input device in operative connection with the at least one computer processor, wherein the at least one user input device is operative to receive account identifying input, wherein the at least one user input device is operative to receive at least one digital content delivery fee authorization input;
    a cash dispenser device in operative connection with the at least one computer processor, wherein the at least one computer processor is operative to cause the cash dispenser device to dispense currency responsive to at least one user input through the at least one user input device corresponding to a cash withdrawal request linked to an account associated with received account identifying input; and
    at least one output device in operative connection with the at least one computer processor, wherein the at least one computer processor is operative to cause dispense of at least one digital sound recording file of the digital information files through the at least one output device to a portable computing device of a user responsive to at least one digital content delivery fee authorization input to the at least one user input device that corresponds to the at least one digital sound recording file, and wherein the at least one computer processor is operative to cause dispense of the same digital sound recording file to plural users.

2. The apparatus according to claim 1 wherein the at least one user input device comprises a card reader device in operative connection with the at least one computer processor, wherein the card reader device is operative to read account data from a card, and wherein the at least one computer processor is operative to cause an account corresponding to read account data to be charged one or more fees corresponding to a dispense of currency and a dispense of the at least one digital sound recording file.

3. The apparatus according to claim 1, wherein the at least one digital sound recording file includes an MP3 file.

4. The apparatus according to claim 1, wherein the at least one output device includes a sound system, and wherein the at least one computer processor is operative to cause output of sound through the sound system responsive to the at least one digital sound recording file.

5. The apparatus according to claim 1 and further comprising a currency acceptor, wherein the at least one computer processor is further operative to cause the dispense of the at least one digital sound recording file responsive to deposit of currency into the currency acceptor.

6. The apparatus according to claim 1 wherein the at least one computer processor is operative to cause a charge of at least one fee associated with a dispense of at least one digital sound recording file.

7. An automated transaction machine apparatus comprising:
- at least one computer processor,
- at least one data store in operative connection with the at least one computer processor, wherein the at least one computer processor is operative to cause a plurality of digital information files to be retrieved from at least one remote digital information source and saved in the at least one data store,
- at least one user input device in operative connection with the at least one computer processor, wherein the at least one user input device is operative to receive user input,
- at least one output device in operative connection with the at least one computer processor, wherein the at least one output device is connectable to a portable computing device, wherein the at least one computer processor is operative to cause dispense of at least one digital sound recording file of the digital information files through the at least one output device responsive to at least one user input through the at least one user input device that corresponds to the at least one digital sound recording file, wherein the at least one computer processor is operative to cause a licensing fee associated with the at least one digital sound recording file to be transferred to a licensing entity, and wherein the at least one computer processor is operative to cause dispense of the same digital sound recording file to plural users.

8. The apparatus according to claim 7 and further comprising a cash dispenser device in operative connection with the at least one computer processor, wherein the at least one computer processor is operative to cause the cash dispenser device to dispense currency responsive to at least one user input through the at least one user input device.

9. Apparatus comprising:
- an automated transaction machine including:
  - at least one user input device, wherein the at least one user input device is operative to receive account identifying input, digital content selection input, and digital content delivery fee authorization input;
  - a cash dispenser, wherein the cash dispenser is operative to deliver cash from the automated transaction machine responsive to at least one user input to the at least one user input device corresponding to a cash withdrawal request linked to an account associated with received account identifying input;
  - at least one output device, wherein the at least one output device is operative to cause delivery of network-downloaded digital content including at least one digital sound recording file to a portable computing device of a machine user responsive to at least one digital content delivery fee authorization input to the at least one user input device, and wherein the at least one output device is operative to cause delivery of the same digital content to different entities;
  - at least one processor, wherein the at least one processor is in operative connection with the at least one user input device, the cash dispenser, and the at least one output device.

10. The apparatus according to claim 9 wherein the at least one output device is releasibly operatively connectable to a portable computing device.

11. The apparatus according to claim 10 wherein the at least one output device comprises a communications port releasibly operatively connectable to a portable computing device adjacent the automated transaction machine.

12. The apparatus according to claim 9 wherein the at least one digital sound recording file comprises a digital music recording file.

13. The apparatus according to claim 9 wherein the at least one digital sound recording file comprises at least one audio-visual file.

14. The apparatus according to claim 9 wherein the at least one user input device is adapted to receive at least one input corresponding to an account, and
the at least one processor is operative to cause the account to be charged for at least one of delivered cash and digital content.

15. The apparatus according to claim 14 and further comprising at least one content data store, wherein the digital content is delivered from the content data store.

16. The apparatus according to claim 15 wherein the content data store comprises a local content data store located in the automated transaction machine.

17. The apparatus according to claim 16 and further comprising:
- at least one network in operative connection with the at least one processor; and
- at least one remote computer in operative connection with the at least one network,
- wherein the at least one remote computer includes at least one remote content data store.

18. The apparatus according to claim 17, wherein the automated transaction machine is operative to selectively deliver digital content from either the local content data store or the remote content data store responsive to at least one input to the at least one user input device.

19. The apparatus according to claim 17 wherein the at least one processor is operative to cause digital content in the remote content data store to be stored in the local content data store.

20. The apparatus according to claim 19 wherein the at least one processor is operative on a periodic basis to cause selected digital content in the remote content data store to be stored in the local content data store.

21. The apparatus according to claim 20 wherein the selected digital content comprises at least one digital sound recording file corresponding to at least one currently top 100 song.

22. The apparatus according to claim 20 wherein the selected digital content comprises at least one digital sound recording file corresponding to at least one currently best-selling book.

23. The apparatus according to claim 20 wherein the selected digital content comprises at least one audiovisual file corresponding to at least one movie.

24. The apparatus according to claim 21 wherein the selected digital content includes at least one graphic image corresponding to the at least one song.

25. The apparatus according to claim 15 and further comprising:
- at least one network in operative connection with the at least one processor; and
- at least one remote computer in operative connection with the at least one network,
- wherein the content data store is in the at least one remote computer.

26. The apparatus according to claim 25 and further comprising:
- at least one financial transaction computer in operative connection with the at least one network, wherein the at least one processor is operative to cause the account to be charged through communication with the at least one financial transaction computer through the at least one network.

27. The apparatus according to claim 15 wherein the at least one user input device is operative to receive a network delivery address, and further comprising:
at least one network in operative connection with the automated transaction machine,
wherein the at least one processor is operative to cause the digital content to be delivered through the at least one network to the network delivery address, whereby a remote computer corresponding to the network delivery address is enabled to receive the digital content.

28. The apparatus according to claim 14 and further comprising:
at least one network in operative connection with the automated transaction machine,
at least one financial transaction computer in operative connection with the at least one network, wherein the at least one processor is operative to cause the account to be charged responsive to communication through the at least one network with the at least one financial transaction computer.

29. The apparatus according to claim 28 wherein the at least one financial transaction computer includes a source account associated with a source of the digital content, and wherein the source account is credited responsive to delivery of the digital content.

30. The apparatus according to claim 28 wherein the at least one financial transaction computer includes a licensing account associated with a licensing entity for the digital content, and wherein the licensing account is credited responsive to the delivery of the digital content.

31. The apparatus according to claim 28 wherein the account is associated with a user of the machine, and wherein the at least one financial transaction computer includes the account, and wherein the account is debited responsive to either delivery of cash or delivery of digital content.

32. The apparatus according to claim 28 wherein the at least one financial transaction computer holds a content prepay account for delivery of digital content, and wherein the at least one processor is operative responsive to at least one input to at least one user input device to cause funds to be transferred from the account to the content prepay account, and wherein the at least one processor is operative to cause the content prepay account to be debited responsive to delivery of the digital content.

33. The apparatus according to claim 28 wherein the at least one output device includes a sound system, and wherein the sound system is operative to output the digital content as audio output.

34. The apparatus according to claim 28 wherein the at least one output device includes an audiovisual output device, and wherein the audiovisual output device is operative to output the digital content as audiovisual output.

35. The apparatus according to claim 14 wherein the at least one user input device includes a card reader, and wherein data corresponding to an account is produced responsive to at least one card read by the card reader.

36. The apparatus according to claim 14 wherein the processor is operative to cause content indicia corresponding to a plurality of portions of the digital content to be output through the at least one output device, and wherein the processor is operative to cause a selected portion of the digital content to be delivered responsive to at least one selection input corresponding to the selected portion, through the at least one user input device.

37. The apparatus according to claim 36 wherein the automated transaction machine includes a display device and the content indicia is output through the display device.

38. The apparatus according to claim 37 wherein the content indicia includes a graphic image corresponding to at least one of the portions of the digital content.

39. The apparatus according to claim 9 wherein the at least one output device includes a reproduction device operative to reproduce the digital content.

40. The apparatus according to claim 39 wherein the reproduction device is operative to reproduce the digital content on a portable storage medium.

41. The apparatus according to claim 9 wherein the digital content is delivered by being reproduced in the portable computing device.

42. The apparatus according to claim 9 wherein the at least one output device includes a sound system, and wherein the sound system is operative to output the digital content as audio output.

43. The apparatus according to claim 9 wherein the at least one output device includes an audiovisual output device, and wherein the audiovisual output device is operative to output the digital content as audiovisual output.

44. The apparatus according to claim 9 wherein the automated transaction machine is operative to cause a charge of at least one fee associated with the delivery of digital content.

45. The apparatus according to claim 9 wherein the automated transaction machine further comprises:
a currency acceptor, wherein the automated transaction machine is further operative to deliver the digital content responsive to deposit of cash into the currency acceptor.

46. Apparatus comprising:
an automated transaction machine including:
at least one input device, wherein the at least one input device is operative to receive digital content delivery fee authorization input,
at least one output device, wherein the at least one output device is operative to cause delivery of digital content including at least one digital sound recording file to a portable computing device responsive to at least one digital content delivery fee authorization input to the at least one input device,
wherein the at least one output device includes a reproduction device operative to cause the digital content to be reproduced in the portable computing device such that play of the digital content is restricted, and wherein the at least one output device is operative to cause delivery of the same digital content to different entities;
at least one processor, wherein the at least one processor is in operative connection with the at least one input device and the at least one output device.

47. The apparatus according to claim 46 wherein the digital content is reproduced in the portable computing device such that it can only be played in the portable computing device.

48. The apparatus according to claim 39 wherein the reproduction device is operative to cause the digital content to be reproduced in a portable computing device, wherein the digital content is reproduced in the portable computing device such that it cannot be further transferred in digital form from the portable computing device.

49. The apparatus according to claim 46 wherein the digital content is reproduced in the portable computing device such that it can only be played a limited number of times.

50. The apparatus according to claim 46 wherein the digital content is reproduced in the portable computing device such that it can only be played during a limited time period.

51. The apparatus according to claim 46 and further comprising a cash dispenser, wherein the cash dispenser is operative to deliver cash from the automated transaction machine responsive to at least one input to the at least one input device.

52. Apparatus comprising:
an automated transaction machine including:
at least one input device, wherein the at least one input device is operative to receive digital content delivery fee authorization input,
at least one output device, wherein the at least one output device is operative to cause delivery of digital content including at least one digital sound recording file responsive to at least one digital content delivery fee authorization input to the at least one input device, wherein the at least one output device includes a reproduction device operative to cause the digital content to be reproduced in a portable computing device such that reproduction of the digital content is restricted, and wherein the at least one output device is operative to cause delivery of the same digital content to different entities,
at least one processor, wherein the at least one processor is in operative connection with the at least one input device and the at least one output device.

53. The apparatus according to claim 52 and further comprising a cash dispenser, wherein the cash dispenser is operative to deliver cash from the machine responsive to at least one input to the at least one input device.

54. A method comprising:
(a) receiving at least one account identifying input at at least one user input device of an automated transaction machine including:
a cash dispenser, wherein the cash dispenser is operative to deliver cash from the automated transaction machine responsive to at least one input to the at least one user input device corresponding to a cash withdrawal request linked to an account associated with received at least one account identifying input;
at least one output device, wherein the at least one output device is operative to cause delivery from the automated transaction machine of network-downloaded digital content responsive to at least one digital content delivery fee authorization input to the at least one user input device, and wherein the at least one output device is operative to cause delivery of the same digital content to different entities;
(b) receiving at least one delivery request input at the at least one user input device; and
(c) delivering from the automated transaction machine either cash or digital content responsive to receiving the at least one delivery request input in step (b), wherein digital content delivery includes recording with a portable computing device of a machine user, network-downloaded digital content comprising at least one file from a group including a sound file, a music file, a document file, an image file, and an audiovisual file.

55. The method according to claim 54 and further comprising:
(d) charging an amount for the delivery of cash or digital content to an account associated with the at least one account identifying input.

56. The method according to claim 55 wherein step (a) comprises reading account identifying indicia from a card with a card reader of the automated transaction machine, and wherein step (d) comprises communicating with a financial transaction computer remotely located from the automated transaction machine.

57. The method according to claim 54 wherein step (c) includes placing a portable computing device in releasible operative connection with the at least one output device.

58. The method according to claim 57 wherein the digital content delivery includes recording a sound file with the portable computing device.

59. The method according to claim 57 wherein the digital content delivery includes recording a music file with the portable computing device.

60. The method according to claim 57 wherein the digital content delivery includes recording a document file with the portable computing device.

61. The method according to claim 57 wherein the digital content delivery includes recording an image file with the portable computing device.

62. The method according to claim 57 wherein the digital content delivery includes recording an audiovisual file with the portable computing device.

63. The method according to claim 54 and further comprising:
(d) crediting a source account associated with a source of the digital content responsive to delivery of digital content in step (c).

64. The method according to claim 54 and further comprising:
(d) crediting a licensing account associated with a licensing entity of the digital content responsive to delivery of digital content in step (c).

65. The method according to claim 54 and further comprising:
(d) debiting an amount from an account associated with the at least one account identifying input;
(e) crediting the amount to a prepay account; and
(f) debiting the prepay account responsive to delivery of digital content in step (c).

66. The method according to claim 54 wherein in step (c) the digital content delivery includes delivering sounds through a sound system.

67. The method according to claim 54 wherein in step (c) the digital content delivery includes delivering audiovisual material through an audiovisual system.

68. The method according to claim 54 wherein step (c) includes delivering digital content comprising digital sound.

69. The method according to claim 54 and further comprising:
(d) reproducing in a local content data store in the automated transaction machine, digital content from at least one remote content data store accessed through at least one network by the automated transaction machine.

70. The method according to claim 69 wherein in step (c) the digital content is delivered from the local content data store.

71. The method according to claim 54 wherein in step (a) the account identifying input comprises a biometric input from a user of the machine.

72. The method according to claim 54 wherein step (c) includes reproducing the digital content on a portable storage medium supplied by the machine.

73. The method according to claim 54 wherein step (c) includes reproducing the digital content on a portable storage medium supplied by a user of the machine.

74. The method according to claim 54 and further comprising:
(d) receiving currency with a currency acceptor of the automated transaction machine; and
wherein step (c) includes delivering the digital content responsive to receipt of currency in step (d).

75. A method comprising:
(a) receiving at least one account identifying input at at least one input device of an automated transaction machine including:
   at least one output device, wherein the at least one output device is operative to cause the delivery of digital content responsive to at least one digital content delivery fee authorization input to the at least one input device, and wherein the at least one output device is operative to cause delivery of the same digital content to different entities;
(b) receiving at least one delivery input at the at least one input device; and
(c) delivering digital content responsive to receiving the at least one delivery input in step (b), wherein digital content delivery includes recording with a portable computing device digital content comprising at least one file from a group including a sound file, a music file, a document file, an image file, and an audiovisual file, wherein the recording is conducted such that reproduction from the portable computing device is restricted.

76. The method according to claim 45 wherein in step (a) the automated transaction machine further includes a cash dispenser operative to deliver cash from the automated transaction machine responsive to at least one input to the at least one input device corresponding to a cash withdraw request.

77. A method comprising:
(a) receiving at least one account identifying input at at least one input device of an automated transaction machine including:
   at least one output device, wherein the at least one output device is operative to cause the delivery of digital content responsive to at least one digital content delivery fee authorization input to the at least one input device, and wherein the at least one output device is operative to cause delivery of the same digital content to different entities;
(b) receiving at least one delivery fee authorization input at the at least one input device; and
(c) delivering digital content responsive to receiving the at least one delivery fee authorization input in step (b), wherein the delivering includes sending the digital content comprising at least one file from a group including a sound file, a music file, a document file, an image file, and an audiovisual file through at least one network to a network delivery address.

78. The method according to claim 77 wherein in step (a) the automated transaction machine further includes a cash dispenser operative to deliver cash from the automated transaction machine responsive to at least one input to the at least one input device corresponding to a cash withdraw request.

79. A method comprising:
(a) receiving at least one user account identifying input at at least one input device of an automated transaction machine, wherein the automated transaction machine is located in an establishment, and wherein the automated transaction machine includes at least one output device, wherein the at least one output device is operative to cause delivery of digital content responsive to at least one digital content delivery fee authorization input to the at least one input device, and wherein the at least one output device is operative to cause delivery of the same digital content to different entities;
(b) receiving at least one delivery fee authorization input at the at least one input device;
(c) delivering digital content responsive to receiving the at least one delivery fee authorization input in step (b), wherein digital content delivery includes delivering sounds through a sound system; and
(d) charging an account associated with the establishment responsive to the digital content delivery.

80. The method according to claim 79 wherein in step (a) the automated transaction machine further includes a cash dispenser operative to deliver cash from the automated transaction machine responsive to at least one input to the at least one input device corresponding to a cash withdraw request, and further comprising
(e) receiving at least one cash withdraw request input with the at least one input device;
(f) operating the cash dispenser to deliver cash from the automated transaction machine responsive to the at least one cash withdraw request input received in step (e).

81. A method comprising:
(a) receiving at least one account identifying input at at least one input device of an automated transaction machine including:
   at least one output device, wherein the at least one output device is operative to cause the delivery of digital content responsive to at least one digital content delivery fee authorization input to the at least one input device, and wherein the at least one output device is operative to cause delivery of the same digital content to different entities;
(b) receiving at least one delivery fee authorization input at the at least one input device;
(c) delivering digital content responsive to receiving the at least one delivery fee authorization input in step (b), wherein digital content delivery includes recording with a portable computing device digital content comprising at least one file from a group including a sound file, a music file, a document file, an image file, and an audiovisual file; and
(d) reproducing in a local content data store in the machine, digital content from at least one remote content data store accessed through at least one network by the machine, wherein in the digital content delivery the digital content is delivered from either the local content data store or the remote content data store.

82. The method according to claim 81 wherein in step (a) the automated transaction machine further includes a cash dispenser operative to deliver cash from the automated transaction machine responsive to at least one input to the at least one input device corresponding to a cash withdraw request.

83. Apparatus comprising:
an automated teller machine (ATM) including:
a cash dispenser operative to dispense cash,
a data store comprising digital files including digital sound,
at least one input device,
   wherein the at least one input device is operative to receive customer input corresponding to a customer bank account,
   wherein the at least one input device is operative to receive customer input corresponding to a cash withdrawal request linked to the customer bank account,
   wherein the at least one input device is operative to receive customer input corresponding to a digital file request linked to the customer bank account,
      wherein the digital file request includes customer selection of at least one data store digital file including digital sound,
at least one output device,
   wherein the at least one output device includes a digital file reproduction device, wherein the reproduction device is operative to reproduce a selected data store digital file to a customer-supplied portable device, a controller in operative connection with the cash dispenser, the data store, the at least one input device, and the at least one output device, wherein the controller is operative to cause cash to be dispensed responsive to a cash withdrawal request, wherein the controller is operative to cause at least one selected data store digital file to be reproduced to a customer-supplied portable device responsive to a digital file request, wherein the controller is operative to assess both a cash withdrawal request and a digital file request to a same customer bank account, wherein the controller is operative to cause reproduction of at least one same data store digital file to different customers of the ATM.

84. The apparatus according to claim 83 wherein the controller is operative to cause the at least one output device to wirelessly communicate a selected digital file to a customer-supplied portable computing device.

85. A method comprising:
(a) receiving, via at least one user input device of an automated teller machine (ATM) having a currency dispenser, identifying data corresponding to a customer account, wherein the currency dispenser is operative to dispense currency responsive to receiving a cash withdrawal request linked to the customer account;
(b) receiving, via the at least one user input device, selection of at least one digital file including digital sound, wherein the at least one digital file is selectable to different users of the ATM;
(c) receiving via the at least one user input device, authorization to use the customer account in payment of the at least one digital file selected in step (b), wherein the customer account is usable in carrying out both a cash withdrawal request and a selected digital file dispense; and
(d) responsive to receiving authorization in step (c), dispensing the at least one digital file selected in step (b), wherein the dispensing includes reproducing to a customer-supplied portable device at least one selected digital file from a data store of the ATM.

86. The method according to claim 85 wherein step (d) includes wirelessly communicating at least one digital file from the ATM to a customer-supplied portable computing device.

87. The method according to claim 85 wherein the customer account comprises a customer bank account, wherein step (c) includes receiving authorization to use the customer bank account.

88. A method comprising:
(a) receiving at least one account identifying input through at least one input device of an automated transaction machine including:
at least one output device, wherein the at least one output device is operative to cause delivery of digital content comprising at least one movie video file responsive to at least one digital content delivery fee authorization input received through the at least one input device, and wherein the at least one output device is operative to cause delivery of the same digital content to different entities,
at least one processor in operative connection with the at least one input device and the at least one output device;
(b) receiving at least one digital content delivery fee authorization input through the at least one input device; and
(c) delivering digital content comprising at least one movie video file responsive to receiving the at least one digital content delivery fee authorization input in step (b), wherein the delivering includes recording the at least one movie video file in a portable computing device such that reproduction of the at least one movie video file from the portable computing device is restricted.

89. The method according to claim 88 wherein step (c) includes recording the at least one movie video file in a portable media player.

90. The method according to claim 89 wherein the at least one output device comprises a communications port, and further comprising
(d) prior to step (c), releasibly connecting the portable media player to the communications port.

91. Apparatus comprising:
an automated transaction machine including:
at least one input device, wherein the at least one input device is operative to receive at least one account identifying input, and wherein the at least one input device is operative to receive digital content delivery fee authorization input,
at least one output device, wherein the at least one output device is operative to cause delivery of digital content comprising at least one movie video file responsive to at least one digital content delivery fee authorization input received through the at least one input device, and wherein the at least one output device is operative to cause the digital content to be recorded in a portable computing device such that reproduction of the at least one movie video file from the portable computing device is restricted,
wherein the at least one output device is operative to cause delivery of the same digital content to different entities,
at least one processor, wherein the at least one processor is in operative connection with the at least one input device and the at least one output device.

* * * * *